United States Patent Office 2,871,814
Patented Feb. 3, 1959

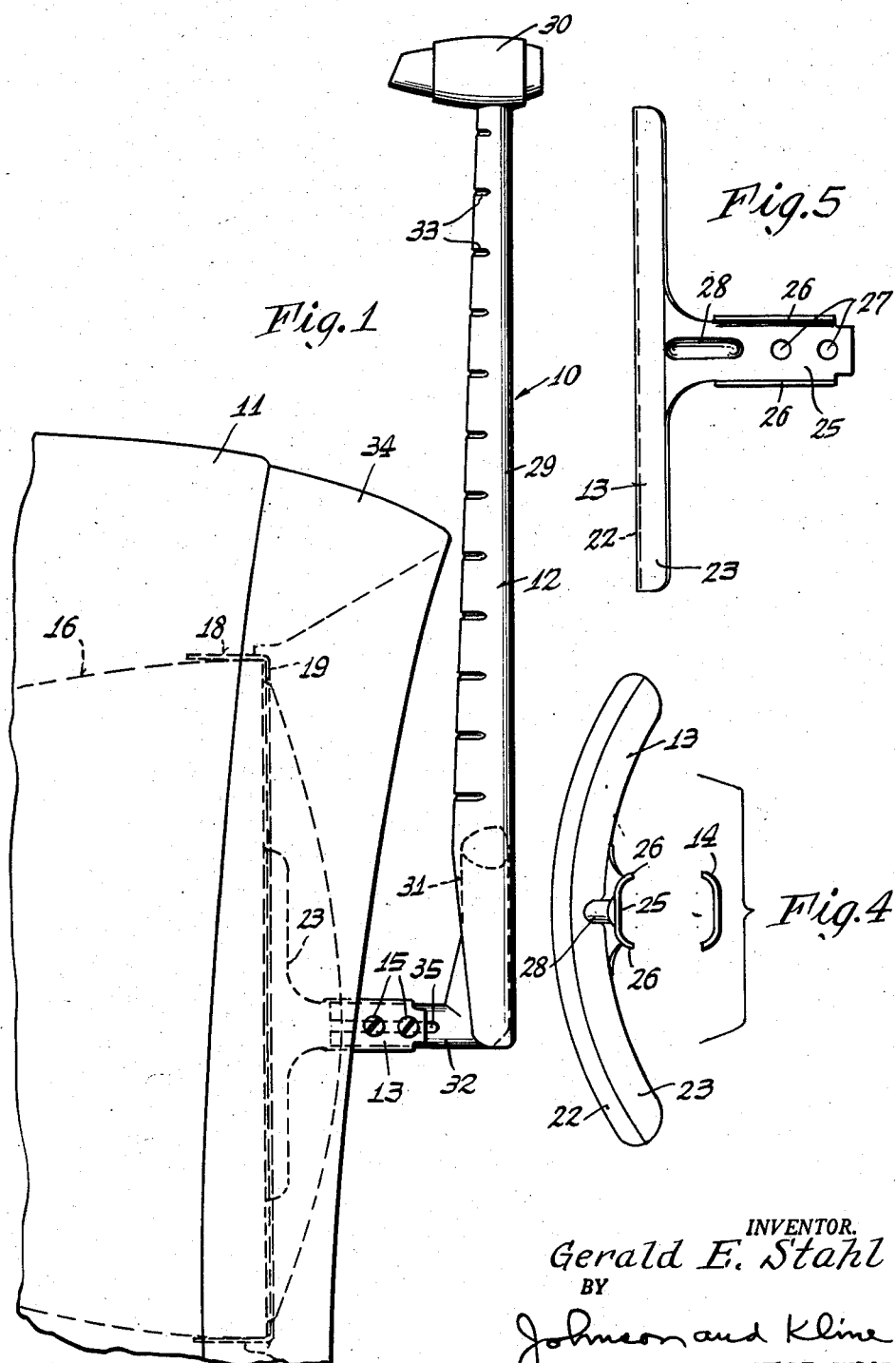

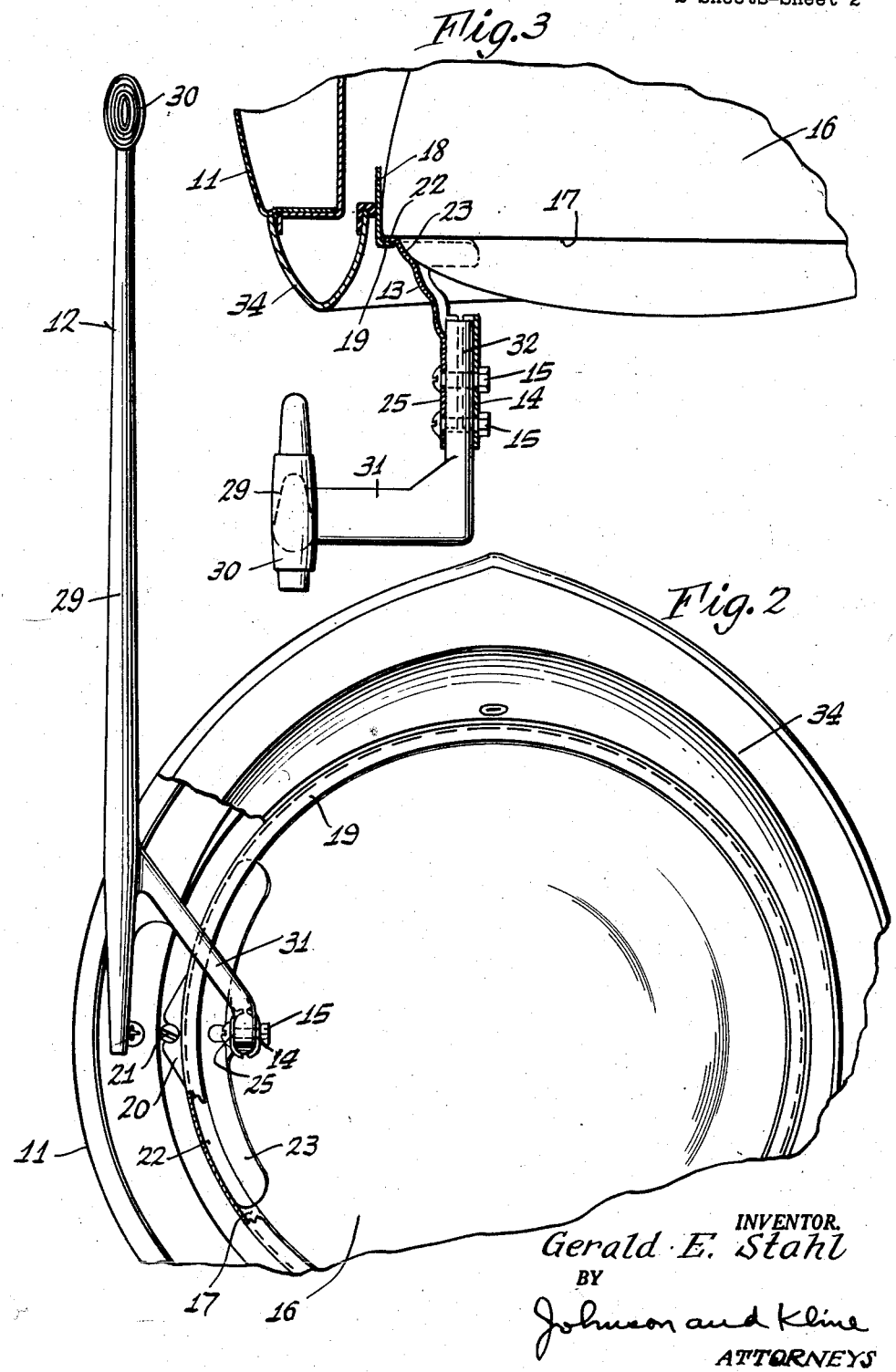

2,871,814

OFFSET FENDER GUIDE

Gerald E. Stahl, Rye, N. Y., assignor to Casco Products Corporation, Bridgeport, Conn., a corporation of Connecticut Application September 5, 1956, Serial No. 608,049

3 Claims. (Cl. 116—28)

The present invention relates to an improvement in automobile fender guides.

An object of the present invention is to provide a fender guide which may be attached to and mounted on the headlight structure of an automobile and which extends vertically in substantial alignment with the side surface of the fender so as to give an indication of the approximate position of the surface to the automobile driver.

Another object of the present invention is to provide a fender guide which attaches to parts of an automobile headlight structure having the same dimensions which are used on a plurality of different makes and models of motor vehicles and, accordingly, the fender guide has substantial universal use.

A further object of the present invention is to provide a fender guide which is capable of being mounted on present day automobiles in which the headlight bulb is recessed below adjacent protruding ornamentation and in which the fender guide may be adjusted to fit headlight structures having different depths.

Another object of the present invention is to provide a fender guide of the above-disclosed type which is formed of material which is transparent and has the property of conducting light along its axis and in which the light from the automobile headlight illuminates the fender guide.

A further object of the present invention is to provide a fender guide which not only indicates to an automobile driver the approximate position of the side of the fender, but also one which gives an indication of the position of the front corner of the automobile.

The fender guide of the present invention is sold as accessory equipment and must be constructed to fit substantially all of the various styles and models of the different automobiles without requiring extensive alteration of the guide. The trend in the styling of the newer models is to have the headlight structure "sunken" or recessed beneath the front surface of the fender and the depth that the headlight is recessed varies tbetween the different makes. A feature of the present invention is the provision of a rod which is connected to an attaching bracket which in turn is fastened to the headlight structure of a motor vehicle. The connection between the rod and support plate is adjustable in length which permits substantially universal utilization of the guide on automobiles, irrespective of the differences therebetween in the degree of recession of the headlight.

Referring to the drawing:

Figure 1 is a side elevation of the fender guide as applied to the headlight structure of an automobile.

Fig. 2 is a front view thereof with portions of the headlight structure and fender shown in section.

Fig. 3 is a plan of Fig. 2, slightly enlarged, with portions of the bracket and fender section being shown in section.

Fig. 4 is an exploded view of the mounting means for the fender guide.

Fig. 5 is a view of the support plate for the fender guide.

Referring to the drawing, the fender guide of the instant invention is generally indicated by the reference numeral 10 and is shown attached to a fender 11 of an automobile, truck or other motor vehicle. The fender guide is composed of a rod 12 and an attaching bracket comprising a support plate 13 and a reinforcing strip 14. Screws and nuts indicated by the reference numeral 15 connect these elements together to form a unitary structure.

Referring to Figs. 2 and 3, the fender 11 is provided with a head lamp 16 of standard construction. This head lamp is of the sealed beam type, i. e. having a unitary reflector and lens with the exterior thereof having an annular ridge 17. A lamp retaining ring 18 has an inwardly directed flange 19 which abuts the ridge 17 and outwardly extending tabs 20, only one of which is shown. A screw 21 fastens the tab 20 to the fender 11 to hold the retaining ring 18 stationary which in turn holds the head lamp in place by reason of the flange 19 and the ridge 17 abutting the head lamp 16 in position on the fender.

The support plate 13 is constructed in the instant embodiment to fit between the ridge 17 and the flange 19. This plate is formed with a flat arcuate portion 22 which fits between the flange and the ridge and a curved arcuate portion 23 which abuts against the lens of a head lamp 16. The portions 22 and 23 are shaped to fit the part of the head lamp 16 against which they are juxtaposed. The support plate terminates in a flat attaching arm portion 25 having flanges 26 disposed on either side and screw apertures or holes 27. If desired, a reinforcing rib 28 may be formed between the arcuate portion 22 and the attaching portion 25. The portion 22 extends at right angles to the attaching portion 25 while the latter is aligned with the axis of the head lamp. The supporting plate is preferably formed of stamped sheet metal which has been suitably plated to provide a non-tarnishing, reflecting finish as may be accomplished by chrome plate.

The light conducting guide element or rod 12 has a vertical portion 29 which has a cross sectional configuration as shown, and terminates at its uppermost portion in an ornament 30 of suitable configuration. The ornament 30 is positioned on the automobile so that it can be easily observed by the driver. Adjacent the lower end of the portion 29, an angularly extending portion 31, integrally connected to the portion 29, is provided. The other end of the portion 31 is connected to a horizontal portion 32 which extends at right angles to the portion 29, that is horizontally when the rod is vertical and is horizontally spaced from the vertical portion 29. The rod in the instant embodiment is formed of transparent material which has the property of conducting light along its axis and materials such as "Plexiglass" or "Lucite" are employed. Thus light from the head lamp 16 enters through the end of the horizontal portion 32 and is directed through the connecting portion 31 and along the vertical portion 29 into the ornament 30 from which it is transmitted. Spaced along the length of the vertical portion 29 are serrations 33 which reflect the headlight glow along the entire length of the guide. The sections 29, 30, 31 and 32 are all integral and preferably molded as one piece.

The present style of automobiles is to have the headlight recessed within the front of the fender and to have ornamentation encircling the headlight but protruding therebeyond. The degree or the length which this ornamentation extends beyond the headlight varies between individual makes and models of automobiles. In the instant embodiment this ornamentation is indicated by the reference numeral 34 and is shown as a piece distinct from the fender which is snapped or screwed into place, though other makes of automobiles may have this encircling member 34 integral with and part of the fender.

According to the present invention, there is provided means for permitting the fender guide to be attached to substantially all makes and models of motor vehicles irrespective of the amount of protrusion and yet still create the impression that the fender guide was custom made for each particular model. This is accomplished by having an adjustable connection between the attaching bracket and the horizontal portion 32. In the specific embodiment shown, the clamping means includes a pair of parallel, spaced arms, namely the strip 14 and the portion 25 with the apertures 27 thereof being aligned. The horizontal portion 32 of the rod has a slot 35 and screws 15 pass through the apertures and slot to clamp the rod at the desired adjusted position. Accordingly, loosening of the screws 15 permits the rod 12 to be moved toward and away from the head lamp along the axis thereof and then tightening of the screws 15 clamps the rod in the selected position. It will be appreciated that the clamping means only engages the sides of the horizontal portion of the rod to leave its terminal or end portion open to permit light to enter into the rod. Also to facilitate the entrance of light, the clamping means is offset from the portions 22 and 23 to have the end of the rod in light receiving position from the headlamp 16.

From the foregoing, it will be perceived that there has been disclosed a fender guide for attachment to a headlight which is recessed within a fender; the degree of recession can be accommodated by adjusting the connection between the support plate and the rod whereby the fender guide of the present invention may be universally mounted on substantially all makes or models of automobiles.

Variations and modifications may be made within the scope of the claims and portions of the improvements may be used without others.

I claim:

1. A fender guide comprising an attaching bracket, said bracket having a clamping means thereon, a light conducting guide element having a vertical portion and a horizontal portion, said horizontal portion being adjustably engaged along its sides only in said clamping means, said clamping means being offset from said attaching bracket to permit the terminal portion of said guide element to receive light from a suitable source.

2. The invention as defined in claim 1 in which the clamping means comprises a pair of spaced, parallel arms with at least one aperture formed in each arm and the apertures being aligned, the horizontal portion is formed to provide a slot and bolt means passing through the apertures and the slot for clamping the rod in the desired adjustable position.

3. The invention as defined in claim 1 in which the rod is a unitary member and formed of material which is transparent and has the property of conducting light along its axis.

References Cited in the file of this patent

UNITED STATES PATENTS

| | | |
|---|---|---|
| 2,481,321 | Marcinik | Sept. 6, 1949 |
| 2,672,841 | Nitzberg | Mar. 23, 1954 |
| 2,753,439 | Greenfield | July 3, 1956 |